Patented Apr. 22, 1952

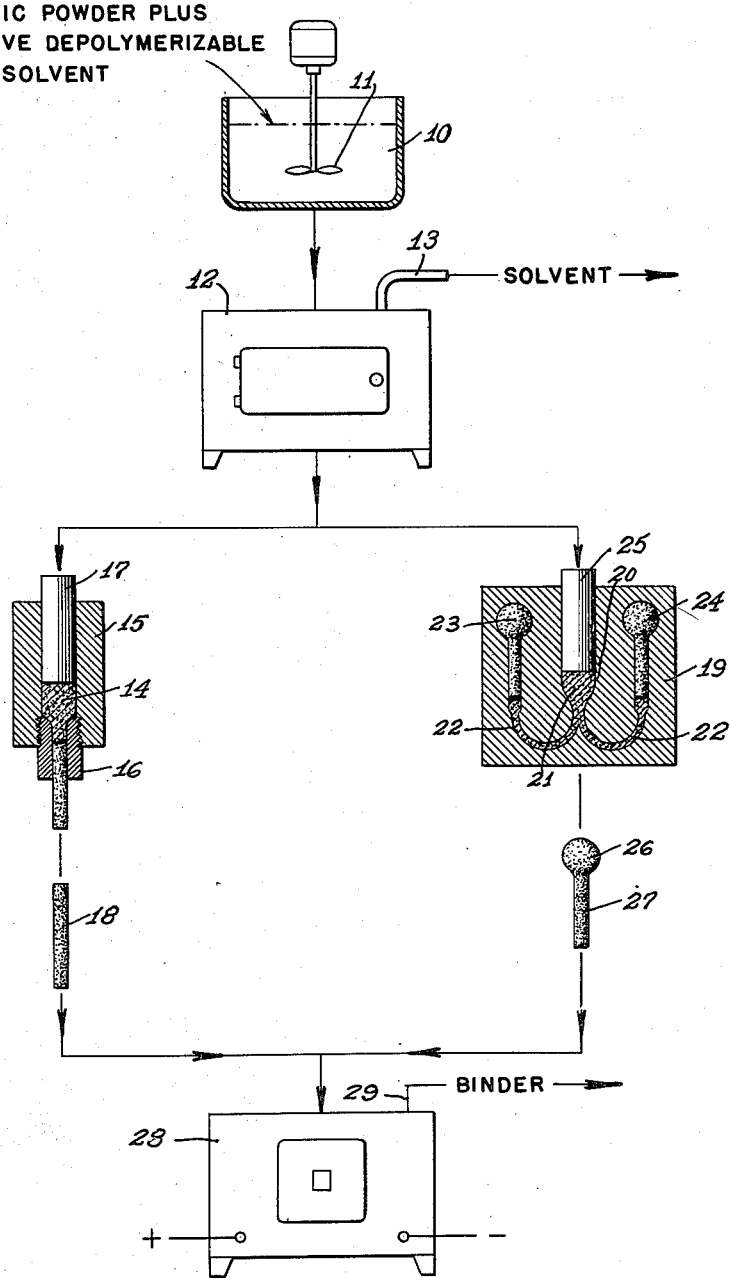

2,593,507

UNITED STATES PATENT OFFICE 2,593,507

METHODS OF MOLDING NONMETALLIC POWDERS

Eugene Wainer, Cleveland Heights, Ohio, assignor, by mesne assignments, to Thompson Products Inc., Cleveland, Ohio, a corporation of Ohio Application March 1, 1949, Serial No. 79,110

5 Claims. (Cl. 25—156)

Certain non-metallic materials in comminuted state have been molded and densified by means of an auxiliary bonding agent and firing to temperatures capable of fusing such bonding agent and causing it to unite the particles of the nonmetallic substances. Thus, in the refractories industry it has been customary to bond magnesia or alumina or other refractory oxide by admixture of a fusible bonding agent, as, for instance, iron oxide or other component, to form fusible mineral bonds between the refractory oxide particles. In the ceramic industry also, for example, non-metallic inorganic material in fine particle size is formed by means of a plasticizer, generally of clay type, into a plastic mass, that is to say, into a mass possessing the ability to flow when subjected to pressure. The plastic mass is then shaped to the desired form, dried, and fired. In procedure where the plastic material is extruded into the desired shape, as for instance in manufacture of sewer pipe, drain tile, building tile, facing brick, etc., plasticity or the ability of the mass to flow when subjected to pressure is required to be of a high order. Since the nonmetallic inorganic particles or powder, as mixed with water, in general lacks plasticity, it has been the practice to mix in argillaceous material, such as clay, bentonite or talc, with the powder to provide the required plasticity. As the clay or bentonite or the like thus becomes part of the composition and remains after the firing, it represents a deleterious impurity. In a few instances, in order to get away from this difficulty, intensive milling by ball mill and special costly equipment has been employed for the reducing of material to particles of colloidal size, and then incorporating a substantial portion of such colloidal material with the coarser particles ordinarily used, in order to attain a limited plasticity when mixed with water. Such practices, employing auxiliary plasticizers, while suitable for certain purposes, of course have the fundamental limitation that any fusible binder correspondingly lowers the overall refractoriness of the product and precludes the attainment of properties otherwise inherent in the material. On account of such limitations, there have been no feasible commercial means for utilizing the possibilities in a large number of oxides, carbides, and minerals. In accordance with the present invention, however, it now become possible to mold such materials and form integral structures of the material undiluted by additions which pull down the refractoriness or other desired properties of the material. The present process accordingly stands in direct contrast to procedures as heretofore which include diluent and low-melting components in the final products. By the present invention a substantially pure integrated product may be had from the desired non-metallic powder.

Non-metallic materials as here contemplated may be converted, by vitrification, into coherent bodies shaped as desired, and containing no detrimental additional matters. And non-metallic particles, in accordance with the invention, may be molded by extrusion into forms not customarily available by prior procedures. The provision of novel moldable materials from non-metallic powders, and other objects and advantages of the invention will be apparent from the following description.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

The non-metallic powder employed may be any non-metallic, non-plastic powder material substantially free from uncombined metal and capable of being vitrified. By non-plastic material is meant a powder material which, mixed with water or liquid, is not capable of flowing uniformly when subjected to pressure. Such materials include inorganic and also some organic materials, also minerals, and synthetic non-metallic materials, oxides, carbides, etc. The particular non-metallic powder employed in any instance will of course depend upon the nature of the product to be produced and the properties desired therein. Examples of non-metallic inorganic compounds which in powder form may be applied in the present invention are oxides such as zirconia, beryllia, alumina, magnesia, silica, titania, thoria, oxides of cobalt, nickel, iron, chromium, lead and tin; carbides, particularly water non-reactive carbides such as those of silicon, titanium, zirconium, chromium, columbium, tantalum, tungsten and molybdenum; minerals such as borax, chromite, foyalite, perovskite, and especially the mineral silicates such as those of the first four vertical groups in the periodic table, for example, mullite, forsterite, feldspar, nepheline, syenite, zircon, beryl, anorthite, orthoclase and the like; salts such as chlorides, for instance silver and sodium chlorides; nitrates, for instance potassium nitrate; phosphates, for instance calcium, aluminum and iron phosphates; tungstates, for instance sodium and calcium tungstates and the like, etc. Examples of non-plastic organic powder materials which are capable of being vitrified are: carbon, non-thermoplastic resins, vulcanized rubber and the like. Mixtures of two or more non-metallic materials may be used if desired. Small amounts of materials that either are non-vitrifiable or which do not become vitrified during the vitrification of the main mass may also be present.

The particle size of the non-metallic powder may vary over a wide range, and particle sizes ranging from 80 mesh and finer can be readily handled in the process. Particles consisting of 300 mesh plus the fines normally present as the result of the milling are most easily handled and hence this range of particle size is generally preferred. In some cases, however, where there is desired low shrinkage in firing as well as high density, a mixture of coarse and fine particles is used, such as, for example, 50 to 70 parts of minus 80 mesh plus 50 to 30 of minus 300 mesh powder. Variously sized non-metallic powders may be used in combination to achieve special results.

The powdered non-metallic material is converted into a plastic mass which is extrudable under pressure, by incorporating an organic heat-fugitive agent. This may be a synthetic polymer or resin with or without addition of a hydrocarbon. In general, such organic material is depolymerizable or decomposable by heat and vaporizes cleanly out of the non-metallic material. The organic agent functions for molding purposes at temperatures considerably above room temperature, and then on further heating toward the range for vitrifying the non-metallic powder component, the organic material is dissipated as a gas. For most of the organic materials thus used, the gaseous escaping product is monomeric. The heat-fugitive organic material may desirably be a poly-mono-olefinic synthetic resin, by which is meant such resins as polybutene, polystyrene, polyacrylate, polymethacrylate, polyethylene, polypropylene, polyvinylbutyl ether. Where further material of wax character is added, this is a hydrocarbon wax which may or may not be of microcrystalline structure. Hydrocarbon waxes, as prepared from wax distillates in the petroleum industry and including paraffins of crystalline character, also of amorphous nature, are applicable. Through the whole range of these, the characteristic is that in the present relation they are fluent at molding temperatures and add slippage or flowage property, and after the article is molded, the wax component, as well as the other heat-fugitive organic material, distills cleanly out as vitrification temperatures are approached. Since clean distillation is accomplished no fixed carbon is formed to prevent sintering of adjacent powder particles. It will, of course, be understood that it is not necessary in all cases to use wax in addition to the heat-fugitive thermoplastic resins, as the latter act effectively in general.

Of the poly-mono-olefinic resins, polybutene and polyvinylbutyl ether are in general suitable for all-around usage. The others, requiring somewhat higher temperatures for decomposition into fugitive gas, are of course also applicable with appropriate materials requiring higher temperatures for vitrification. Included also with the foregoing are halogenated derivatives, and these may be substituted for or used in conjunction with the synthetic resins. Like such, they decompose completely without residue; they also have another important property, viz., as halogenated derivatives, one of the products of decomposition is a dry hydrogen halide. The presence of a small amount of HCl or like halide aids the development of a dense structure through acceleration of diffusion processes at the high temperatures. Examples of these resins are: chlorinated polyethylene, fluorinated polyethylene, chlorfluorinated polyethylene, the chlorinated diphenyls (these being commercially known as the "Aroclors"). These chlorinated diphenyls are available in molecular weights of a range such as from thin liquid to stiff resinoid solid. They are thermoplastic, and the low molecular weight type act as lubricants. In effect, the first group of resins alone or combinations of the first group plus the halogenated type constitute the base resins used in these mixtures. In some instances, such a halogenated resin can be used to provide the desired functions including that of lubricant. Also effective in this respect are the liquid polybutenes, that is, polybutenes having molecular weights less than 1,000. The molecular weight of the poly-mono-olefinic resins may vary somewhat, but aside from the liquid usage just mentioned, they may range in general about 20,000 to 200,000.

The plastic mass is prepared from the non-metallic powder by incorporating the heat-fugitive organic material. The relative amounts will vary somewhat, depending upon the particular non-metallic powder, and in general there may be employed a ratio of relative volume between the powder and organic material of at least 65 to 35 and preferably up to 50 to 50. The mass is mixed and heated to a temperature sufficient to melt the wax ingredient, but below a temperature at which any distillation of the wax takes place. The particle size of the non-metallic powder may vary over a wide range, and sizes between 80 mesh and a fineness of several hundred mesh can be handled. Particles consisting of 300 mesh plus the fines normally present from milling are most easily handled, and such range of particle size is generally preferable. In some cases, however, where low shrinkage in firing is desired, a mixture of coarse and fine particles may be used, for example 50–70 parts of minus 80 mesh plus 50–30 parts of minus 300 mesh powder.

In the practice of my invention, I find it desirable to prepare the batch by one of two methods:

1. The resin wax system is dissolved completely in a solvent. In general, this may be an aromatic hydrocarbon, as xylene and homologs, naphthas, etc. The proper amount of non-metallic powder is added and a thorough mix obtained. The solvent is then eliminated by heating for a sufficient time above the boiling point thereof, and after the solvent is eliminated, the batch is ready for introduction into the molding machine.

2. The second procedure eliminates use of solvents entirely. The proper amount of non-metallic powder and organic heat-fugitive material being placed in a hot mixer, the batch is kneaded to a homogeneous consistency at an elevated temperature.

Once the batch is prepared, it is worked for a substantial time in suitable equipment while in the plastic stage. It may then be transferred to a slug-forming machine and a slug be formed to fit the barrel of an extrusion machine, if the molding is to be carried out by extrusion. Vacuum de-airing may be applied in the slug-forming operation if desired. A particular advantage of the present process is that the molding may be performed by extrusion, that is, a die-expressing formation or by extrusion into a receiving die. Of course, other forms of molding equipment can also be used where desired. For extrusion forming, high pressure is involved, and this may be on the order of 10,000 lbs. per square inch and more. One advantage in molding the material by extrusion is that thereby continuous lengths can be formed as rods, tubes, slotted tubes, bars, and the like and I, U, X, and Y shapes. On account of the organic material in the mass requiring sufficient elevation of temperature to insure its being in melted condition, it is generally desirable that the extrusion die be sufficiently heated, and thus temperatures may be used on the order of 120° to 200° C.

The shaped article coming from the mold assumes a self-sustaining form with a stiffening of the organic material and can be handled or transferred to the heating furnace in which the organic material is to be driven out and the non-metallic particles be vitrified sufficiently to suitably solidify and finish the article. The heating temperature required to vaporize and expel the organic material depends somewhat on the particular ingredient, but in all cases such temperatures lie below vitrification temperatures of the non-metallic particles, and treatment in the furnace first eliminates the organic matter and leaves an article of non-metallic constitution which in the further heat can vitrify to more or less densify it as desired.

The following examples are indicative of the manner of practicing the invention:

1. Non-metallic powder having a particle size of 300 mesh plus the fines resulting from the grinding is used. In Table 1 below are given examples of materials used and their respective specific gravities.

TABLE 1

| Material | Specific Gravity | Material | Specific Gravity |
|---|---|---|---|
| alumina | 4.00 | silicon carbide | 3.2 |
| beryllia | 3.03 | mullite | 3.15 |
| silica | 2.65 | litharge | 9.53 |
| titania | 4.20 | tin oxide | 7.0 |
| zirconia | 5.7 | tungsten carbide | 16.0 |
| zircon | 4.6 | beryl | 2.7 |
| thoria | 9.7 | chromite | 4.4 |
| iron oxide | 5.2 | fayalite | 4.1 |
| chromium oxide | 5.2 | anorthite | 2.7 |
| nickel oxide | 7.45 | orthoclase | 2.56 |
| cobalt oxide | 6.5 | nephelite | 2.60 |
| magnesia | 3.7 | forsterite | 3.2 |
| titanium carbide | 4.25 | perovskite | 4.0 |

A xylene solution of polybutene is added and the indicated amount of hydrocarbon wax. In Table 2 below are given, for each 100 grams of powdered non-metallic material, the amounts of polybutene solution, the base amount of polybutene and the amount of wax required in each specific gravity range.

TABLE 2

| Specific Gravity of Powder | Volume of 10% Polybutene Solution | Wax |
|---|---|---|
| 1 | 660 | 6.6 |
| 2 | 330 | 3.3 |
| 3 | 220 | 2.2 |
| 4 | 165 | 1.7 |
| 5 | 133 | 1.3 |
| 6 | 110 | 1.1 |
| 7 | 94.5 | 0.95 |
| 8 | 82.5 | 0.83 |
| 9 | 73.5 | 0.74 |
| 10 | 66.0 | 0.66 |
| 11 | 60.0 | 0.60 |
| 12 | 55.0 | 0.55 |
| 13 | 51.0 | 0.50 |
| 14 | 47.0 | 0.50 |
| 15 | 44.0 | 0.45 |
| 16 | 41.0 | 0.40 |

In Table 3 below is given a list of the various other resins and combinations which might be used in place of the polybutene and wax. The mass is evaporated to dryness at about 140 to 160° C. until all solvent is dissipated. The batch is kneaded and re-kneaded in a hot Read (sigma) mixer. It is then re-kneaded and slugged to fit the barrel of the extrusion press. Pressures of at least 10,000 pounds per square inch are required for the extrusion. The resulting formed shapes are transferred to an oven or furnace and heated slowly through the distillation range of the resinoid material which is usually below 1,000° F. The shape is finally vitrified under conditions of temperature and atmosphere dictated by the non-metallic component of the shaped article.

TABLE 3

*Resins which can be used*

1. Polybutene.
2. Polyvinylbutyl ether.
3. Polyacrylate.
4. Polymethacrylate.
5. Chlorinated diphenyls.
6. Halogenated polyethylenes.
7. Polyethylene.
8. Combinations of 1 with one or more of 2 to 7, particularly 5 and 6.

*Lubricants*

1. Waxes.
2. Low molecular weight polybutenes.
3. Low molecular weight chlorinated diphenyls.

2. If a firing shrinkage less than that obtained in Example 1 is desired, the particle sizes of the non-metallic powder used are varied as follows: 60 parts by weight of 100 mesh powder are mixed with 40 parts by weight of 300 mesh powder. In this case, the amount of resinoid system is 10 to 35% less than set forth in Example 1. Otherwise, the procedure set forth in previous example is followed.

Considerable modification is possible in the selection of the non-metallic powder, the resin, and the lubricant, as well as in the amounts thereof employed and in the steps of the process, without departing from the essential features of the present invention.

3. In place of the unitary materials listed in Example 1, the base materials may consist of combinations of various ceramic materials, of combinations of various ceramic materials and metalloids such as carbides, nitrides, borides and so forth, combinations of various metalloids such as carbides, nitrides, borides and so forth, of combinations of metals and non-metals, of combinations of metals and metalloids, of combinations of metalloids and non-metals.

4. In place of solvent systems of resins, solvent-free resins may be employed and the batch mixed hot.

5. Polybutene having a molecular weight of 60,000 is dissolved in xylene so that a 10% solution results. A hydrocarbon mineral wax having a melting point of 120° C. is added to the polybutene solution so that the solution is equivalent to a 1% solution with respect to the wax. Said mineral waxes are trade designated as "microcrystalline." The various powders can be used in finenesses equivalent to 300 mesh plus the fines developed by grinding. When mixed powders are to be used, the necessary intimate mixture is obtained by ball milling.

TABLE 4

| Ceramic Material | Specific Gravity | Volume of 10% Polybutene Solu. per 100 grams | Grams Wax per 100 grams | Firing Temperature About |
|---|---|---|---|---|
| | | | | °F. |
| Alumina | 4.00 | 165 | 1.7 | 3,200 |
| Beryllia | 3.03 | 219 | 2.2 | 3,400 |
| Silica | 2.65 | 249 | 2.5 | 2,950 |
| Titania | 4.20 | 057 | 1.6 | 2,500 |
| Zirconia | 5.7 | 116 | 1.2 | 2,600 |
| Zircon | 4.6 | 143 | 1.4 | 3,200 |
| Thoria | 9.7 | 68 | 0.7 | 3,600 |
| Iron oxide | 5.2 | 127 | 1.3 | 2,100 |
| Chromium oxide | 5.2 | 127 | 1.3 | 3,200 |
| Nickel oxide | 7.45 | 89 | 0.9 | 2,100 |
| Cobalt oxide | 6.5 | 101 | 1.0 | 2,100 |
| Magnesia | 3.7 | 178 | 1.8 | 3,400 |
| Mullite | 3.15 | 209 | 2.1 | 3,100 |
| Beryl | 2.7 | 244 | 2.4 | 2,600 |
| Forsterite | 3.2 | 206 | 2.1 | 3,000 |
| Perovskite | 4.0 | 165 | 1.7 | 2,500 |
| 95 Zirconia / 5 Lime | 5.4 | 122 | 1.2 | 3,400 |
| 90 Alumina / 20 Magnesia | 3.9 | 170 | 1.7 | 3,200 |
| 88 Zircon / 12 Clay | 4.4 | 147 | 1.5 | 2,800 |

In accordance with foregoing Table 4, 100 grams of each of the ceramic powders are mixed with the amount of polybutene solution and wax indicated in the table, and after thorough mixing the xylene is eliminated by heating at 160° C. for two hours. The xylene free mass is kneaded in a hot mixer until smooth and is then slugged in a vacuum de-airing machine. The slug is placed in the barrel of a hot extrusion press which is maintained at a temperature of 160° C. The mass is formed using an extrusion pressure of 20,000 pounds per square inch.

The resulting shapes are fired in air in a gas fired furnace. To obtain the temperatures needed for the most refractory of the materials indicated, the fuel used is a mixture of line gas and acetylene, burned in a mixture of air and oxygen. A fairly standard schedule of firing is 200° F. per hour to peak temperature, hold 3 hours at peak, then shut off furnace.

6. The procedure according to Example 5 is used except that the materials according to Table 5, below, are used, and firing is accomplished in pure dry hydrogen.

The hydrogen is purified as follows: Water vapor is removed by passage of the hydrogen through phosphorus pentoxide; oxygen is removed by passage through copper turnings heated to 1600° F.; nitrogen is removed by passage over titanium hydride heated to 2000° F. The sintering equipment used is a molybdenum wound resistor furnace, the molybdenum windings being maintained in a pure hydrogen atmosphere.

TABLE 5

| Material | Specific Gravity | Volume of 10% Polybutene Solu. per 100 grams | Grams Wax per 100 grams | Sintering Temperature About |
|---|---|---|---|---|
| | | | | °F. |
| Titanium carbide | 4.25 | 155 | 1.6 | 3,500 |
| 85 titanium carbide / 15 cobalt | 5.0 | 131 | 1.3 | 2,650 |
| Tungsten carbide | 16.0 | 41 | 0.4 | 3,500 |
| 92 tungsten carbide / 8 cobalt | 15.4 | 43 | 0.4 | 2,650 |
| 85 alumina / 15 chromium | 4.3 | 154 | 1.5 | 2,950 |
| 65 chromium boride / 35 nickel | 5.75 | 115 | 1.2 | 2,600 |
| 85 silicon carbide / 15 silica | 3.1 | 209 | 2.1 | 3,200 |

The annexed sheet of drawings contain a schematic diagram illustrating the process of the present invention. As shown on the drawings a mixture of finely divided vitrifiable non-metallic powder and a heat-fugitive depolymerizable binder dissolved in a solvent are introduced into a mixer 10 having an agitator 11 therein for thoroughly mixing the ingredients into a plastic mass. After mixing, the resulting mixture is next introduced into a drying oven 12 where the mixture is heated to a plastic flowable condition without distillation of the binder. During this heating, the solvent originally introduced in combination with the depolymerizable binder is vaporized and removed from the oven at 13.

The plastic mass leaving the drying oven 12 may then be formed into a desired shape through a variety of forming processes. In the drawings, there are illustrated two processes which can conveniently be used for such shaping. The left-hand side of the drawing illustrates an extrusion process in which the plastic mass 14 is introduced into the cavity of an extrusion barrel 15. The mass is extruded through an extrusion orifice 16 by the action of punch 17 slidable within the extrusion barrel 16. The extruded mass may be cut into appropriate lengths in the form of a cylindrical rod 18.

On the right-hand side of the drawings, there is illustrated an injection molding system for forming shaped articles from the plastic mass. This assembly includes a mold assembly 19 having a central cavity 20 for receiving the plastic mass 21. The central cavity 20 communicates with a pair of leaders 22 which in turn feed the plastic mass to a pair of injection cavities 23 and 24. A punch 25 supplies the necessary pressure for forcing the mass 21 through the leaders 22 and into the appropriate cavities 23 and 24. The illustrated shaped mass resulting from this operation is a plastic rod having a spherical head portion 26 and a cylindrical body portion 27, as illustrated on the drawings.

The shaped plastic article, produced by either or both of the illustrated systems is next introduced into a vitrification furnace 28 which in the illustrated instance is a wire wound resistance furnace. In the furnacing operation, the plastic articles are heated to a temperature sufficient to volatilize the binder which is removed at 29, and to vitrify the ceramic composition without any residue of binder appearing in the fired article.

Other modes of applying the principle of the invention may be employed, change being made as regards the detail described, provided the features stated in any of the following claims, or the equivalent of such, be employed.

I therefore particularly point out and distinctly claim as my invention:

1. The method of making a non-metallic article of desired shape and porosity which comprises heating to a plastic flowable stage without distillation of the binder therein, a mixture composed of 50 to 65 parts by volume of a non-metallic non-plastic powder substantially free from uncombined metal and capable of being vitrified and 35 to 50 parts by volume of a thermoplastic completely distillable binder containing a major proportion of a poly-mono-olefinic thermoplastic resin, pressure molding the thus heated flowable mass into desired article shape, and firing the article at temperatures materially above the distillation temperature of the binder until the binder is completely and cleanly removed from the article and until the powder particles are sintered.

2. The method of making a non-metallic article of desired shape and porosity from non-metallic powder substantially free from uncombined metal which comprises admixing 50 to 65 parts by volume of said powder with 35 to 50 parts by volume of a thermoplastic completely distillable binder containing a major proportion of a poly-mono-olefinic thermoplastic resin, heating the mixture to soften the binder without distilling off any of the binder to form from said mixture a flowable mass, extruding the thus heated mass at temperatures of about 120 to 200° C. into desired article shape, and firing the article to sinter the non-metallic powder and completely vaporize the binder cleanly out of the non-metallic material without forming a residue in the article.

3. The method of making a non-metallic article of desired shape which comprises heating to a plastic flowable stage without distillation of the binder therein a mixture composed of 50 to 65 parts by volume of a non-metallic non-plastic powder substantially free from uncombined metal capable of being vitrified and 35 to 50 parts by volume of a completely distillable binder containing a major proportion of poly-mono-olefinic thermoplastic resin and hydrocarbon wax, extruding the thus heated flowable mass into a desired shape, and sintering the shape at temperatures materially above the distillation temperature of the binder to completely and cleanly vaporize the binder ingredients out of the body of the shape without formation of a residue in the body.

4. The method of making a non-metallic article of desired shape which comprises heating to a plastic flowable stage without distillation of the binder therein a mixture composed of 50 to 65 parts by volume of a non-metallic non-plastic powder substantially free from uncombined metal capable of being vitrified and 35 to 50 parts by volume of a completely distillable binder containing a major proportion of poly-mono-olefinic thermoplastic resin and thermoplastic halogenated hydrocarbon, pressure molding the thus heated flowable mass into the shape of an article, and sintering the article at relatively high temperatures to liberate hydrogen halide gas from the binder for aiding in the development of a dense structure in the sintered article and to completely vaporize all of the binder without formation of a residue in the article.

5. The method of making a non-metallic article of desired shape and porosity which comprises heating a mixture composed of 50 to 65 parts by volume of a non-metallic, non-plastic powder material substantially free from uncombined metal and capable of being vitrified and 35 to 50 parts by volume of a thermoplastic completely distillable binder containing a major proportion of poly-mono-olefinic thermoplastic resin, a hydrocarbon wax and a thermoplastic chlorinated hydrocarbon, continuing said heating to produce a plastic flowable mass without distillation of the binder ingredients, extruding the heated flowable plastic mass into desired article shape, and firing the article at temperatures materially above the distillation temperature of the binder ingredients to completely vaporize the binder cleanly out of the non-metallic powder material and to sinter non-metallic powder without forming a residue in the article.

EUGENE WAINER.

REFERENCES CITED

The following references are of record in the file of this patent:

UNITED STATES PATENTS

| Number | Name | Date |
|---|---|---|
| 2,068,411 | Heuer | Jan. 19, 1937 |
| 2,124,235 | Mueller-Cunradi | July 19, 1938 |
| 2,131,342 | Baldeschwieler | Sept. 27, 1938 |
| 2,286,672 | De Lamatter | June 16, 1942 |
| 2,327,846 | Kistler | Aug. 24, 1943 |
| 2,335,097 | Aken | Nov. 23, 1943 |
| 2,363,575 | De Lamatter et al. | Nov. 28, 1944 |
| 2,385,580 | Knox | Sept. 25, 1945 |
| 2,390,354 | Clapp | Dec. 4, 1945 |
| 2,431,303 | Billmeyer | Nov. 25, 1947 |
| 2,434,271 | Howatt | Jan. 13, 1948 |
| 2,467,550 | Fletcher et al. | Apr. 19, 1949 |